United States Patent Office 3,830,816
Patented Aug. 20, 1974

3,830,816
1 - CYCLOPROPYLMETHYLENEAMINO - 3,4 - DI-HYDROISOQUINOLINE AND ACID ADDITION SALTS THEREOF
Maurice Ward Gittos, Slough, John William James, Langley, and John Pomfret Verge, Henley, England, assignors to Aspro-Nicholas Limited, Slough, England
No Drawing. Continuation-in-part of application Ser. No. 805,868, Mar. 10, 1969, now Patent No. 3,652,570. This application Mar. 27, 1972, Ser. No. 238,530
Claims priority, application Great Britain, Mar. 9, 1968, 11,633/68
Int. Cl. C07d 33/52
U.S. Cl. 260—286 R 2 Claims

ABSTRACT OF THE DISCLOSURE 1-cycloprpoylmethyleneamino-3,4 - dihydroisoquinoline is a novel compound possessing hypotensive activity. It may be prepared by the reaction of cyclopropylmethyleneamino with 1,2,3,4-tetrahydro-1-isoquinolthione or with 1-alkylthio-3,4-dihydroisoquinoline.

---

This application is a continuation-in-part of Ser. No. 805,868, filed Mar. 10, 1969, now U.S. Pat. No. 3,652,-570, patented Mar. 28, 1972.

The instant invention relates to a new heterocyclic amine, its use and preparation.

According to the instant invention, there is provided 1-cyclopropylmethyleneamino-3,4-dihydroisoquinoline of the formula

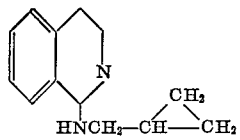

and acid addition salts thereof.

1-cycloprpoylmethyleneamino-3,4 - dihydroisoquinoline may be prepared either *per se* or as an acid addition salt by the reaction of cyclopropylmethyleneamine of the formula

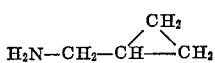

or an acid addition salt thereof with 1,2,3,4-tetrahydroisoquinoline of the formula

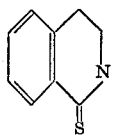

or with a 1-alkylthio-3,4-dihydroisoquinoline of the formula

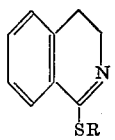

where R represents an alkyl group containing up to 6 carbon atoms. The reaction is normally carried out in a polar solvent such as, for example, dimethylformamide, dimethylacetamide or dimethylsulphoxide and an elevated reaction temperature, for example above 90° C., is preferable in order to shorten reaction times (usually from 1 to 6 hours although longer reaction times are of course possible). Preferred imidate reactants are 1-methyl- and 1-ethyl-thio-3,4-dihydroisoquinolines.

The imidate reactants are usually prepared in one of two ways. Thus, they may be prepared by reaction of phenethyl-isothiocyanate (obtainable by the general method described in J.A.C.S., 82 at 4328) with aluminium chloride to form 1,2,3,4-tetrahydroisoquinolthione and, when an alkylthioimidate is required, thereafter reacting the thione with a suitable alkylating agent such as an alkyl halide, sulphate or sulphonate. Alternatively, the alkylthioimidates may be prepared directly by reaction of a mixture of an alkylthiocyanate and stannic chloride with 2-chloroethylbenzene.

As mentioned above, the compound of the instant invention may be isolated either *per se* or as an acid addition salt.

The acid addition salts are preferably the pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example, glycollic, maleic, hydroxymaleic, malic, tartaric, citric, salicyclic, o-acetyloxybenzoic, nicotinic or isonicotinic acid, or organic sulphonic acids for example methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric or oxalic acid; they may serve as intermediates in the purification of the base compound or in the preparation of other, for example pharmaceutically acceptable, acid addition salts, or are useful for identification, characterization or purification of the base compound.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate for example sodium, potassium or calcium carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

The compound and salts of the instant invention are useful as intermediates in the preparation of other compounds having pharmaceutical activity and are also useful in their own right for their pharmacological properties. Such properties include cardiovascular activity and in particular hypotensive activity.

In the method aspect of the invention, there is provided a method of treating hypertension in animals comprising administering to said animals a hypotensively effective amount of 1-cyclopropylmethyleneamino-3,4-dihydroisoquinoline or a pharmaceutically acceptable acid addition salt thereof.

In the composition aspect of the invention there are provided pharmaceutical formulations in which form the active compound or salt of the invention will normally be utilised. Such formulations are prepared in a manner well known in the pharmaceutical art and usually comprise the active compound of the invention or a salt thereof in admixture or otherwise in association with a pharmaceutically acceptable carrier therefor. For making these formulations the active ingredient will usually be mixed with a carrier, or diluted by a carrier, or enclosed or encapsulated in a capsule, sachet, cachet, paper or other container. A carrier or diluent may be a solid, semi-solid or liquid material which serves as a vehicle, excipient or medium for the active ingredient. Some examples of such diluents or carriers are lactose, dextrose, sucrose, sorbitol, mannitol, starches, gum acacia, calcium phosphate, liquid paraffin, cocoa butter, oil of theobroma, alginates, tragacanth, gelatin, syrup B.P., methyl cellulose, polyoxyethylene sorbitan monolaurate, methyl- and propylhydroxybenzoate, talc, magnesium stearate or mineral oil.

The formulations of the invention may be adapted for enteral or parenteral use and may be administered to a subject requiring treatment, for example an animal suffering hypertension, in the form of tablets, capsules, suppositories, solutions, suspensions or the like. The dosage required for the treatment of any animal will usually fall within the range of about 0.01 to 250 mg./kg. and for example in the treatment of adult humans, each dosage of active ingredient will normally be from about 0.01 to 15 mg./kg. The formulations of the invention may therefore be provided in dosage unit form, preferably each dosage unit containing from 1 to 1000 mg. more advantageously from 5 to 500 mg. and most preferably from 10 to 250 mg. of the active ingredient of the invention.

The following examples illustrate the instant invention:

EXAMPLE 1

Ethyl thiocyanate (39 g.) was added with stirring to anhydrous stannic chloride (130.2 g., 62.5 ml.). The temperature rose to 78° C. accompanied by formation of a white crystalline complex. 2-phenyl ethyl chloride (75 g.) was added and there was an induction period before the temperature rose to 135° C. On falling back to 110° C. the mixture was maintained at this temperature for 3 hours by heating in an oil bath. White fumes were evolved during this period. The hot dark reaction mixture was poured into 1 litre of approximately 5N sodium hydroxide solution and stirred vigorously until the solid complex had been decomposed and dissolved to form a dark brown oil. After cooling the mixture was extracted with ether. The ethereal solution was extracted with 5N hydrochloric acid and the aqueous layer charcoaled and filtered before basifying with sodium hydroxide solution and again extracting with ether. The ethereal solution was dried and the ether removed by distillation, the residue being distilled under reduced pressure to yield 1-ethylthio-3,4-dihydroisoquinoline, b.p. 89–95° C./0.1 mm.

1-ethylthio-3,4-dihydroisoquinoline hydrochloride (0.03 mole) prepared from the above and cyclopropylmethyleneamine (0.03 mole) were dissolved in dimethylformamide (30 ml.) and heated to 130° C. for 2½ hours. The mixture was cooled and excess ether added to complete precipitation. The solid was collected, washed with ether, dried and then recrystallised from ethanol/ether to yield 1-cyclopropylmethyleneamino-3,4-dihydroisoquinoline hychloride m.p. 120–2° C.

The degree of hypotensive activity of the compound of the instant invention has been assessed by a standard laboratory procedure described in "Manual for Laboratory Work in Mammalian Physiology," D'Amour and Blood, University of Chicago Press 1963. This test involves a direct measurement of the arterial blood pressure from the carotid artery in rats anaesthetized with urethane, the latter being used as the anaesthetic because it causes little depression of autonomic reflexes and gives a steady baseline for several hours. Actual measurement of the hypotensive activity was made by connecting the carotid cannula to a blood pressure transducer (Devices/ C.E.C. instrument) and the blood pressure automatically monitored on a recorder (Device M8). The results obtained at a dose level of 8 mg./kg. administered intravenously were as follows:

Fall in mean blood pressure from normal of 100–130 mm. Hg=30 mm. Hg
Fall and duration=26% for 20 mins.
Fall in heart rate=28%

The compound has an $LD_{50}$ value of 90 mg./kg. when administered subcutaneously.

It can be seen from the above that the compound of the instant invention has an extremely useful therapeutic index in rats and it is confidently expected that these findings will be repeated in other animals, in particular in humans.

In the following examples of pharmaceutical compositions, the term "medicament" is used to indicate the compound 1-cyclopropylmethylene - 3,4 - dihydroisoquinoline hydrochloride.

EXAMPLE 2

Tablet formulation

|  | Mg./tablet |
| --- | --- |
| Medicament | 15 |
| Lactose | 86 |
| Maize starch (dried) | 45.5 |
| Gelatin | 2.5 |
| Magnesium stearate | 1.0 |

The medicament was powdered and passed through a B.S. No. 100 sieve and well mixed with the lactose and 30 mg. of the maize starch, both passed through a B.S. No. 44 sieve.

The mixed powders were massed with a warm gelatin solution prepared by stirring the gelatin in water and heating to form a 10% w./w. solution. The mass was granulated by passing through a B.S. No. 12 sieve and the moist granules dried at 40° C.

The dried granules were re-granulated by passing through a B.S. No. 14 sieve and the balance of the starch sieved 44 mesh and the magnesium stearate sieved 60 mesh were added and thoroughly mixed.

The granules were compressed to produce tablets each weighing 150 mg.

EXAMPLE 3

Tablet formulation

|  | Mg./tablet |
| --- | --- |
| Medicament | 100 |
| Lactose | 39 |
| Maize starch (dried) | 80 |
| Gelatin | 4.0 |
| Magnesium stearate | 2.0 |

The method of preparation is identical with that of Example 2 except that 60 mg. of starch is used in the granulation process and 20 mg. during tabletting.

EXAMPLE 4

Capsule formulation

|  | Mg./capsule |
| --- | --- |
| Medicament | 250 |
| Lactose | 150 |

The medicament and lactose were passed through a No. 44 B.S. sieve and the powders well mixed together before filling into hard gelatin capsules of suitable size, so that each capsule contained 400 mg. mixed powders.

EXAMPLE 5

Suppositories

|  | Mg./suppository |
| --- | --- |
| Medicament | 50 |
| Oil of Theobroma | 950 |

The medicament was powdered and passed through a B.S. No. 100 sieve and triturated with molten oil of Theobroma at 45° C. to form a smooth suspension.

The mixture was well stirred and poured into moulds, each of nominal 1 g. capacity, to produce suppositories.

EXAMPLE 6

Cachets

| | Mg./cachet |
|---|---|
| Medicament | 100 |
| Lactose | 400 |

The medicament was passed through a B.S. No. 40 mesh sieve, mixed with lactose previously sieved 44 mesh and filled into cachets of suitable size so that each contained 500 mg.

EXAMPLE 7

Intramuscular injection (suspension in aqueous vehicle)

| | Mg. |
|---|---|
| Medicament | 10 |
| Sodium citrate | 5.7 |
| Sodium carboxymethylcellulose (low viscosity grade) | 2.0 |
| Methyl para-hydroxybenzoate | 1.5 |
| Propyl para-hydroxybenzoate | 0.2 |
| Water for injection, to 1.0 ml. | |

The sodium citrate and sodium carboxymethylcellulose were mixed with sufficient water for injection at 80° C. The mixture was cooled to 50° C. and the methyl and propyl para-hydroxybenzoates added followed by the medicament previously milled and sieved 300 mesh. When cool the injection was made up to volume and sterilized by heating in an autoclave.

Having regard to the foregoing disclosure, the following is claimed as the inventive and patentable embodiments thereof:

1. A substance selected from 1-cyclopropylmethyleneamino - 3,4 - dihydroisoquinone and its nontoxic acid addition salts.

2. The substance according to Claim 1 which is 1-cyclopropylmethyleneamino - 3,4 - dihydroisoquinoline hydrochloride.

References Cited

UNITED STATES PATENTS 3,644,636   2/1972   Jeanmart _____ 260—288 R

DONALD G. DAUS, Primary Examiner

U.S. Cl. X.R.

260—283 S, 288 R; 424—250

UNITED STATES PATENT OFFICE
CERTIFICATE OF CORRECTION

Patent No. 3,830,816  Dated August 20, 1974

Inventor(s) Maurice Ward Gittos et al

It is certified that error appears in the above-identified patent and that said Letters Patent are hereby corrected as shown below:

Column 1, lines 17 and 40 : "cyloprpoyl" should be --cyclopropyl--

Column 1, line 35 : " 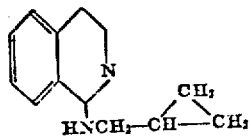 "

should be

-- 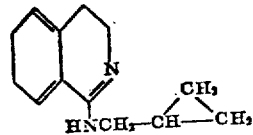 --

Column 1, line 47 : "quinoline" should be --quinolthione--

Column 6, line 11 : "dihydroisoquinone" should be --dihydroisoquinoline--

Signed and Sealed this ninth Day of March 1976

[SEAL]

Attest:

RUTH C. MASON
Attesting Officer

C. MARSHALL DANN
Commissioner of Patents and Trademarks